(12) United States Patent
Anderson et al.

(10) Patent No.: US 12,732,939 B2
(45) **Date of Patent: *Sep. 8, 2026**

(54) WIRELESS CONNECTION MONITORING, CLASSIFICATION, AND PRIORITY

(71) Applicant: Charter Communications Operating, LLC, St. Louis, MO (US)

(72) Inventors: Erik A Anderson, Aurora, CO (US); Loay O. Kreishan, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 174 days.

This patent is subject to a terminal disclaimer.

(21) Appl. No.: 18/142,684

(22) Filed: May 3, 2023

(65) Prior Publication Data

US 2023/0276400 A1 Aug. 31, 2023

Related U.S. Application Data

(63) Continuation of application No. 17/104,605, filed on Nov. 25, 2020, now Pat. No. 11,678,290.

(51) Int. Cl.

| | |
|---|---|
| ***H04W 64/00*** | (2009.01) |
| ***H04W 8/18*** | (2009.01) |
| ***H04W 48/16*** | (2009.01) |
| ***H04W 76/10*** | (2018.01) |
| *H04W 88/08* | (2009.01) |

(52) U.S. Cl.

CPC ............ *H04W 64/00* (2013.01); *H04W 8/18* (2013.01); *H04W 48/16* (2013.01); *H04W 76/10* (2018.02); *H04W 88/08* (2013.01)

(58) Field of Classification Search

CPC ....... H04W 64/00; H04W 76/10; H04W 8/18; H04W 48/16; H04W 88/08; H04W 4/029; H04W 4/021

See application file for complete search history.

(56) References Cited

U.S. PATENT DOCUMENTS

| | | | | |
|---|---|---|---|---|
| 11,172,520 B2 | 11/2021 | Xu | | |
| 2016/0073336 A1* | 3/2016 | Geller | .................. | H04W 48/20 455/434 |
| 2017/0055185 A1* | 2/2017 | Chaudhuri | ........ | H04W 36/0085 |

(Continued)

*Primary Examiner* — Khawar Iqbal
(74) *Attorney, Agent, or Firm* — Armis IP Law, LLC

(57) ABSTRACT

A connection management resource tracks multiple instances of a mobile communication device wirelessly connecting to each of multiple wireless access points at different times to access a remote network. Based on the tracking, the connection management resource determines a set of the multiple wireless access points that reside in a first geographical region. The connection management resource then assigns a selected wireless access point such as a first wireless access point from the set as being a default wireless access point in which to provide the mobile communication device wireless connectivity to the remote network. In one situation, the connection management resource assigns the first wireless access point as the default wireless access point in response to detecting that the mobile communication device most frequently, amongst the multiple instances, establishes wireless connectivity with the first wireless access point to access the remote network.

16 Claims, 14 Drawing Sheets

(56) References Cited

U.S. PATENT DOCUMENTS

2017/0238240 A1* 8/2017 Gunasekara .......... H04W 64/00 370/338
2019/0029069 A1 1/2019 Shim et al.
2019/0116550 A1* 4/2019 Yang ................. H04W 28/0273
2019/0319951 A1* 10/2019 West, III ............. H04L 63/0876
2020/0029292 A1* 1/2020 Zou ................... H04W 56/0045
2020/0100302 A1* 3/2020 Xu ........................ H04W 48/16
2020/0142388 A1* 5/2020 Maggiore ............. H04W 4/025
2020/0204588 A1 6/2020 Harvey et al.
2020/0344257 A1* 10/2020 Basavapatna ....... H04L 63/1416
2021/0195439 A1 6/2021 Prabhakar et al.
2021/0235370 A1* 7/2021 Yang ................. H04W 28/0273
2021/0258215 A1* 8/2021 Brophy ............... H04L 41/0816
2021/0302592 A1 9/2021 Cambridge et al.
2021/0329545 A1 10/2021 Morioka
2022/0014512 A1 1/2022 Raleigh et al.
2022/0026585 A1 1/2022 Hassan et al.
2022/0061091 A1 2/2022 Hedayat et al.
2023/0061347 A1* 3/2023 Bouchet ................ H04W 92/20
2023/0379772 A1* 11/2023 Hart .................. H04W 36/0079

* cited by examiner

TRACKING INFO. 155

| TIME | DAY OF WEEK | WIRELESS CONNECTIVITY |
|---|---|---|
| T1 (08:37 - 10:56) | MONDAY | WAP 134 |
| T2 (13:10 - 17:05) | MONDAY | WAP 133 |
| T3 (19:01 - 20:34) | MONDAY | WAP 123 |
| T4 (08:31 - 12:00) | TUESDAY | WAP 134 |
| T5 (12:34 - 17:14) | TUESDAY | WAP 134 |
| T6 (19:21 - 19:45) | TUESDAY | WAP 134 |
| T7 (08:00 - 11:55) | WEDNESDAY | WAP 123 |
| T8 (14:05 - 17:35) | WEDNESDAY | WAP 123 |
| T9 (18:31 - 20:53) | WEDNESDAY | WAP 134 |
| | • • • | |
| T11 (08:00 - 12:10) | FRIDAY | WAP 134 |
| T12 (10:10 - 10:30) | SATURDAY | WAP 123 |
| T13 (19:01 - 20:34) | SATURDAY | WAP 122 |
| T14 (13:31 - 13:56) | SUNDAY | WAP 123 |
| T15 (08:31 - 10:52) | MONDAY | WAP 134 |
| T16 (13:00 - 18:05) | MONDAY | WAP 133 |
| | • • • | |

FIG. 5

| TYPE | TIME OF DAY (24 HOUR CLOCK) | WEEKEND MULTIPLIER |
|---|---|---|
| HOME | 0:00 - 5:59 | x4 |
| WORK | 9:00 - 11:59 | x1 |
| WORK | 13:00 - 15:59 | x1 |
| • • • | • • • | • • • |

FIG. 7

WIRELESS CONNECTION MONITORING, CLASSIFICATION, AND PRIORITY

RELATED APPLICATION

This application is a continuation application of earlier filed U.S. patent application Ser. No. 17/104,605 entitled "WIRELESS CONNECTION MONITORING, CLASSIFICATION, AND PRIORITY,", filed on Nov. 25, 2020, the entire teachings of which are incorporated herein by this reference.

BACKGROUND

Conventional wireless networks provide connectivity of mobile communication devices to the Internet via respective wireless access points (based on one or more wireless protocols such as WiFi™, LTE, NR, etc.).

For example, assume that a mobile communication device establishes a respective wireless communication link with a first wireless access point. Via communications over the respective wireless communication link, the mobile communication device is able to send/receive data over the Internet. In many instances, a respective mobile communication device moves from one location to another in a respective wireless network environment. In such an instance, the mobile communication device connects to different wireless access points.

In certain instances, the location of the mobile communication device is known based on feedback from the mobile communication device. Based on such information, the mobile communication device can be tracked.

Conventional methods to detect home and work networks depends on identifying the user's home and work SSIDs (Service Set IDentifiers) through backend system configuration commands sent to the user's wireless router to pull user's configuration setup on the router. This method depends on GPS (Global Positioning System) to identify a user's location and associate it with a respective SSID.

BRIEF DESCRIPTION OF EMBODIMENTS

There are deficiencies associated with conventional techniques of identifying different types of networks to which a respective device connects. For example, it is not always known whether a user installs a wireless router that belongs to (or is registered with) the carrier or service provider. Use of private wireless routers will not enable the service provider to detect the SSID associated with a subscriber device. Additionally, backend configuration does not exist on some older wireless routers. Further, the use of geolocation from a mobile communication device or other entity does not give accurate measures in dense population areas.

Embodiments herein include providing improved techniques of controlling connectivity of a respective mobile communication device to a wireless access point.

More specifically, during a learning mode, a connection management resource tracks multiple instances of a mobile communication device wirelessly connecting to each of multiple wireless access points at different times to access a remote network. Based on the tracking, the connection management resource determines a set of the multiple wireless access points that reside in a first geographical region. After analyzing, the connection management resource assigns a selected wireless access point such as a first wireless access point from the set as being a default wireless access point in which to provide the mobile communication device wireless connectivity to the remote network in the future.

In one embodiment, the connection management resource assigns the first wireless access point as the default wireless access point in response to detecting that the mobile communication device most frequently, amongst the multiple instances of the mobile communication device using different wireless access points at the first geographical region, establishes wireless connectivity with the first wireless access point to access the remote network.

Further embodiments herein include, via the connection management resource, assigning the first wireless access point as the default wireless access point depending on a number of times (or amount of corresponding usage) of the multiple instances in which the mobile communication device establishes wireless connectivity with the first wireless access point to access the remote network while in the first geographical region. In one embodiment, the number of times or amount of use is indicative of the likelihood that the first wireless access point is part of a network to which a user of the mobile communication device subscribes.

In still further example embodiments, subsequent to assigning the first wireless access point as the default wireless access point for the first geographical region, the connection management resource receives a command to connect the mobile communication device to the remote network while the mobile communication device resides in the first geographical region. In response to receiving the command to provide a connection, and detecting that the default wireless access point is available to the mobile communication device, the connection management resource selects the default wireless access point (amongst multiple possible wireless access points) to establish a wireless connection with the mobile communication device.

Further embodiments herein include, subsequent to assigning the first wireless access point as the default wireless access point for the first geographical region, receiving a command to connect the mobile communication device to the remote network. In response to receiving the command, embodiments herein include: i) obtaining discovery information indicating a group of wireless access points present in a vicinity of the mobile communication device at a particular instant of time, and ii) in response to detecting presence of the default wireless access point in a group of detected wireless access points as indicated by the discovery information, selecting the default wireless access point to establish a wireless connection with the mobile communication device.

Note that in accordance with further example embodiments, the set of wireless access points is a first set of wireless access points. The default wireless access point is a first default access point. Based on the tracking as previously discussed, the connection management resource also determines a second set of the multiple wireless access points that reside in a second geographical region (disparately located with respect to the first geographical region). The connection management resource assigns a second wireless access point from the second set as being a second default wireless access point in which to provide the mobile communication device wireless connectivity to the remote network.

Note further that the default wireless access points can be classified based on a time at which the mobile communication device typically connects to such devices to access the remote network. For example, in one embodiment, based on respective time information associated with the instances of mobile communication device wirelessly connecting with each of the multiple wireless access points, the connection management resource classifies the first default wireless access point as a first type and classifies the second default wireless access point as a second type.

More specifically, in one embodiment, the connection management resource classifies the first default wireless access point as being a home network (wireless access point) of a subscriber that operates the mobile communication device; the connection management resource classifies the second default wireless access point as being a work network (wireless access point) of the subscriber that operates the mobile communication device.

Determination of the set of the multiple wireless access points that reside in the first geographical region occurs in any suitable manner. In one embodiment, the connection management resource detects wireless access points in the first geographical region based on detecting that the mobile communication device communicates with each of the multiple wireless access points in the set within a window of time of time. In one embodiment, the connection management resource utilizes one or more instances of time of day, day of week, etc., information associated with the mobile communication device wirelessly connecting with the multiple wireless access points as a basis to identify a network type associated with a respective default wireless access point.

Yet further example embodiments herein include, via the connection management resource, producing a confidence value indicating a likelihood that the wireless access point designated as a default wireless access point is a network of a particular type. As previously discussed, in one embodiment, the connection management resource determines a location (such as home environment, work environment, etc.) of the default wireless access point based on the different instances of the mobile communication device wirelessly connecting with each of multiple wireless access points to access the remote network.

Embodiments herein are useful over conventional techniques. For example, embodiments herein provide a unique way of identifying a type of default wireless network (such as wireless access point) used by the mobile communication device at different times.

Yet further embodiments herein are useful to: i) enhance mobile data offloading to Wi-Fi networks, ii) enhance connection policy and provision wireless profiles, iii) collect network analytics, iv) report Wi-Fi™ connection abnormalities, etc.

Note that any of the resources as discussed herein can include one or more computerized devices, connection management resources, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and/or operations summarized above and disclosed in detail below. One such embodiment comprises a computer program product including a non-transitory computer-readable storage medium (such as any computer readable hardware storage medium, computer readable storage hardware, etc.) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage hardware medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed on a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate location detection and allocation of one or more wireless channels in a network environment. The instructions, when executed by computer processor hardware, cause the computer processor hardware (such as one or more co-located or disparately processor devices or hardware) to: track multiple instances of a mobile communication device wirelessly connecting to each of multiple wireless access points at different times to access a remote network; based on the tracking, determine a set of the multiple wireless access points that reside in a first geographical region (for example, wireless access points that reside within a distance of each other); and assign a first wireless access point from the set as being a default wireless access point in which to provide the mobile communication device wireless connectivity to the remote network when the mobile communication device is in the first geographical region.

Note that the ordering of the steps above has been added for clarity sake. Further note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of managing communication services associated with a mobile communication device. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other as a different embodiment. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

BRIEF DESCRIPTION OF THE DRAWINGS

FIG. 5 is an example diagram illustrating tracking information indicating operation of a respective mobile communication device and corresponding detected wireless station connectivity according to embodiments herein.

FIG. 7 is an example diagram illustrating implementation of different weights to detected wireless connectivity events to determine a type associated with a respective wireless access point according to embodiments herein.

Figure 1:
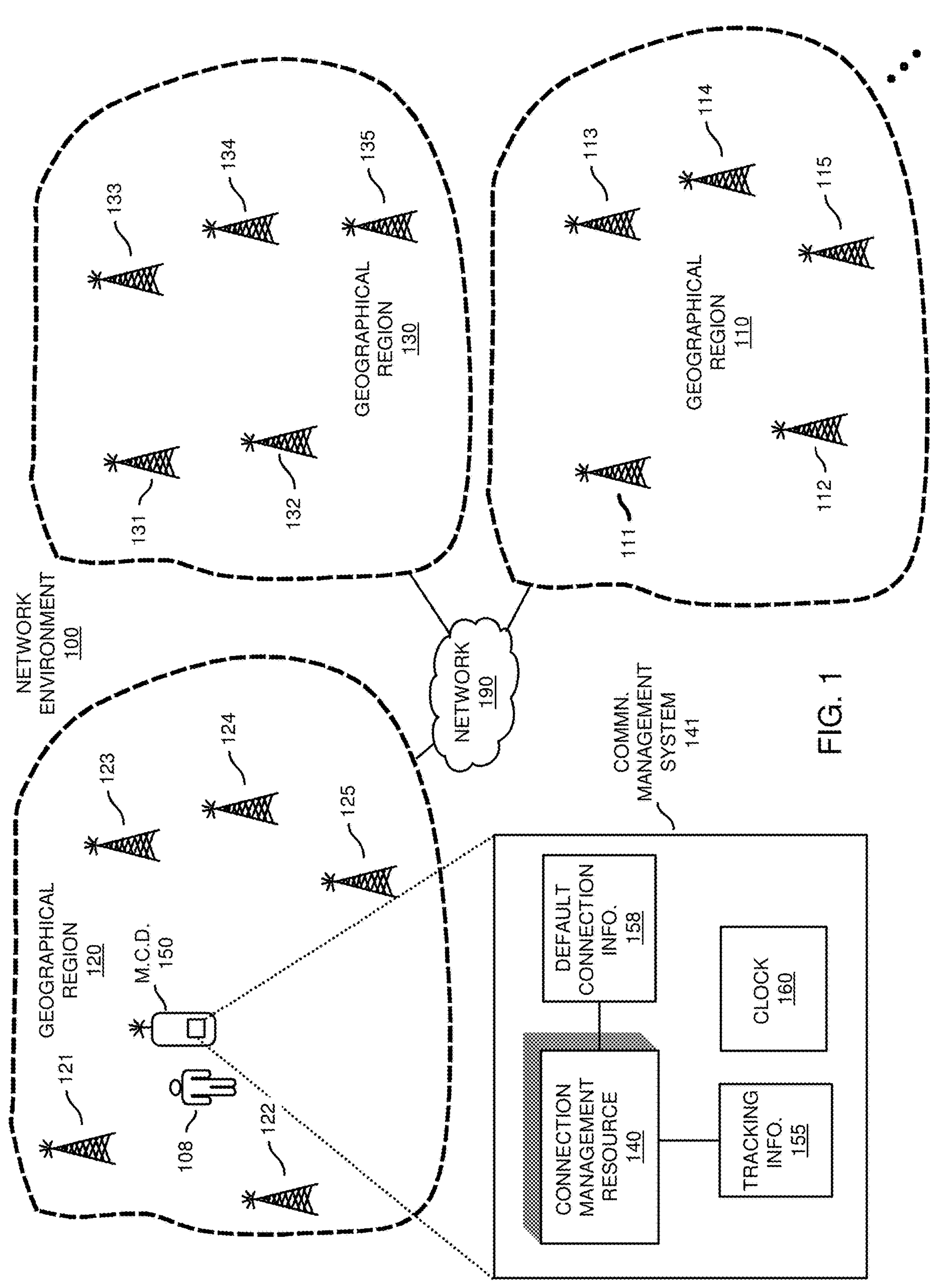
FIG. 1 is an example diagram illustrating different regions of a respective network environment and implementation of a communication management system according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a connection management resource that tracks multiple instances of a mobile communication device wirelessly connecting to each of multiple wireless access points at different times to access a remote network. Based on the tracking, the connection management resource determines a set of the multiple wireless access points that reside in a first geographical region. The connection management resource assigns a selected wireless access point such as a first wireless access point from the set as being a default wireless access point in which to provide the mobile communication device wireless connectivity to the remote network.

In one embodiment, the connection management resource assigns the first wireless access point as the default wireless access point in response to detecting that the mobile communication device most often, amongst the multiple different instances of accessing the remote network while in the first geographical region, uses wireless connectivity provided by the first wireless access point to access the remote network.

Now, more specifically, with reference to the drawings, FIG. 1 is an example diagram illustrating different regions of a respective network environment and implementation of a communication management resource according to embodiments herein.

As shown, network environment 100 includes multiple geographical regions such as geographical region 110, geographical region 120, and geographical region 130.

Each geographical region includes multiple wireless access points providing connectivity to a remote network 190. For example, geographical region 110 includes wireless access point 111, wireless access point 112, wireless access point 113, wireless access point 114, and wireless access point 115.

Geographical region 120 includes wireless access point 121, wireless access point 122, wireless access point 123, wireless access point 124, and wireless access point 125.

Geographical region 130 includes wireless access point 131, wireless access point 132, wireless access point 133, wireless access point 134, and wireless access point 135; and so on.

Note that the components in network environment 100 can be instantiated in any suitable manner. For example, the connection management resource 140 can be implemented as connection management hardware, connection management software, or a combination of connection management hardware and connection management software; connection management system 141 can be implemented as communication management hardware, communication management software, or a combination of communication management hardware and communication management software; each of the wireless access points can be implemented as wireless access point hardware, wireless access point software, or a combination of wireless access point hardware and wireless access point software; the mobile communication device 150 can be implemented as mobile communication hardware, mobile communication software, or a combination of mobile communication hardware and mobile communication software; and so on.

Further in this example embodiment, the mobile communication device 150 and each wireless access point supports any suitable one or more wireless communication protocol such as WiFi™, LTE (Long Term Evolution), NR (New Radio), etc.

User 108 is able to operate the mobile communication device 150 (such as user equipment) in the different geographical regions at different times to access remote network 190.

As further shown, the mobile communication device 150 includes communication management system 141. The communication management system 141 includes connection management resource 140.

As further discussed herein, initially, the connection management resource 140 operates in a learning mode. During the learning mode, the connection management resource 140 produces tracking information 155 based on connectivity of the mobile communication device 150 wirelessly connecting to different wireless access points in each of the geographical region 110, 120, 130, etc. Clock 160 (such as indicating time of day, day of week, etc.) associated with communication management system 141 enables the connection management resource 140 to determine and keep track of different times (such as time of day, day of week, etc.) when the mobile communication device 150 is connected to the different wireless access points.

Based on habits and/or history of the mobile communication device 150 wirelessly connecting to the different wireless access points in each of the geographical regions 110, 120, and 130, based on the learning mode and collected information, the connection management resource 140 produces default connection information 158 indicating when and how long the mobile communication device 150 uses the different wireless access points to access the remote network 190. More specifically, based on the tracking information 155, the connection management resource 140 produce default connection information 158 indicating which of the different available wireless access points is a default wireless access point for the corresponding geographical region.

In one embodiment, the connection management resource 140 generates the default connection information 150 via classification of the different wireless access points based on one or more parameters such as time of day, day of week, etc., that such default wireless access points are used. As further discussed herein, classification of different wireless access points can include assigning a class type such as work, home, etc., to the default one or more wireless access points and corresponding supported wireless networks in each geographical region.

As further discussed herein, subsequent to the learning and generation of the default connection information 158, the connection management resource 140 operates in a control mode in which the default connection information 158 is used as a basis to control wireless connectivity of the mobile communication device 150 to different wireless access points depending on a location of the mobile communication device 150 attempting to access remote network 190. Additionally, there is no need to know a location of the mobile communication device 150 to provide the mobile communication device 150 appropriate connectivity to the remote network 190.

Thus, in one embodiment, the connection management resource 140 tracks multiple instances of the mobile communication device 150 wirelessly connecting to each of multiple wireless access points at different times to access the remote network 190. Based on the tracking, and generated tracking information 155 during the learning mode, the connection management resource 140 determines a set of the multiple wireless access points that reside in each respective geographical region. For each respective geographical region, the connection management resource 140 then assigns a corresponding selected wireless access point in the geographical region as being a default wireless access point in which to control future wireless connectivity of the mobile communication device 150 to the remote network 190. If desired, the connection management resource 140 can be configured to assign multiple wireless access points as being default wireless access points to provide future wireless access to the mobile communication device 150.

Figure 2:
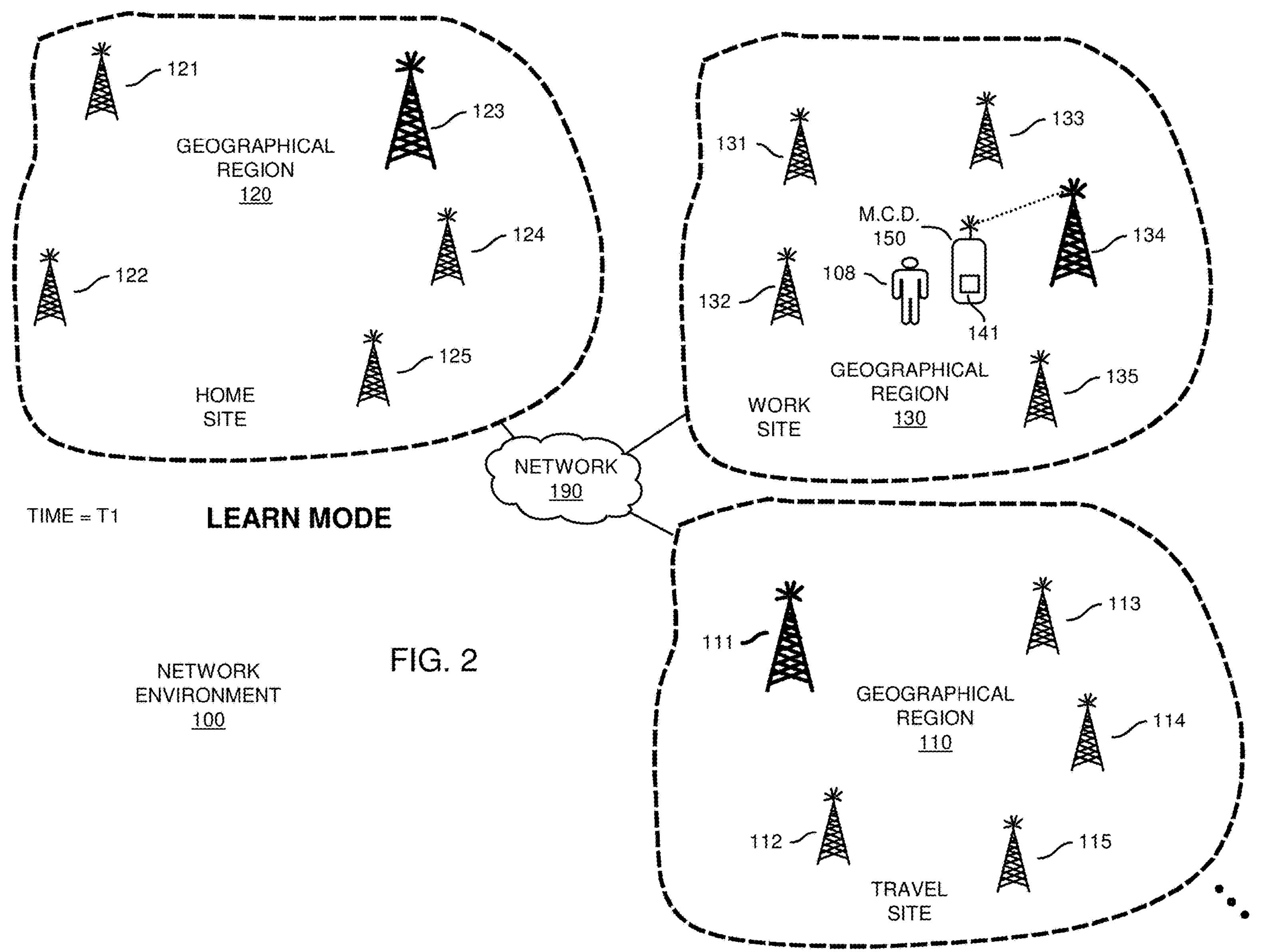
FIG. 2 is an example diagram illustrating operation of a communication management resource in a learning mode while in a first wireless region according to embodiments herein.

FIG. 2 is an example diagram illustrating operation of a communication management system in a learning mode while in a first wireless region according to embodiments herein.

In this example embodiment, the communication management system 141 operates in a learning mode in which the mobile communication device 150 is free (such as with or without input from the user 108 indicating which wireless access point in which to connect) to connect to any of the multiple wireless access points in geographical region 130 (such as work environment where the user 108 resides while working) to access the remote network 190.

For example, based on input (such as a command) from the user 108 (or application on the mobile communication device 150) to connect to a respective remote network 190 such as the Internet or other type of network, the communication management system 141 connects to any of one or more wireless access points 131, 132, 133, 134, etc., to provide the user 108 and corresponding mobile communication device 150 access to the network 190. Each of the wireless access points are in communication with the remote network 190 via wired or wireless link.

Note further that, in the learning mode, any suitable criteria can be used to determine which of the multiple wireless access points to establish a respective wireless communication link. For example, in one embodiment, when attempting to connect to a respective wireless access point while the mobile communication device 150 resides in the geographical region 130, via one or more beacons from the wireless access points, the mobile communication device 150 receives notification of the availability of different wireless access points 131, 132, 133, 134, 135, etc.

The mobile communication device 150 selects from the one or more wireless access points to connect to the remote network 190 (such as the Internet). In the learning mode, via tracking information 155, the connection management resource 140 keeps track of one or more parameters such as the time of day, day of week, duration, etc., associated with a respective established wireless connection.

For each instance of the multiple instances of the mobile communication device 150 connecting to the different wireless access points in the geographical region 130 over time, the connection management resource 140 updates the corresponding tracking information 155 to indicate time of day, day of week, length of use, etc. Accordingly, in the learning mode, via the communication management system 141, embodiments herein include producing tracking information 155 as a history, habit, etc., of the mobile communication device 150 connecting to different wireless access points at different times while in the geographical region 130.

Figure 3:
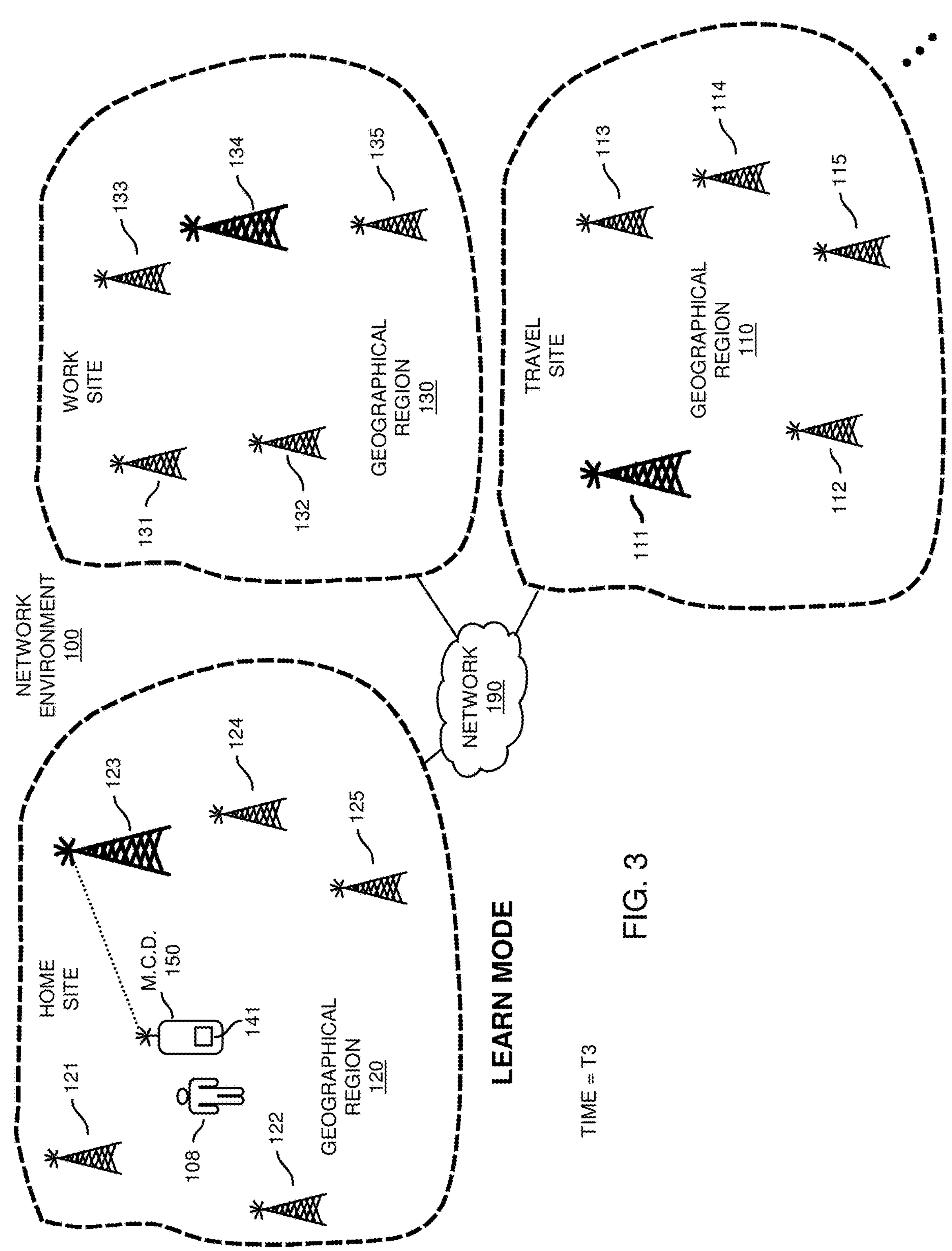
FIG. 3 is an example diagram illustrating operation of a communication management resource in a learning mode while in a second wireless region according to embodiments herein.

FIG. 3 is an example diagram illustrating operation of a communication management system in a learning mode while in a second wireless region according to embodiments herein.

In this example embodiment, the communication management system 141 operates in a learning mode in which the mobile communication device 150 is free (such as with or without input from the user 108 indicating which wireless access point in which to connect) to connect to any of the multiple wireless access points in geographical region 120 (such as home environment, subscriber domain, etc., where the user 108 resides).

For example, based on input (such as a command) from the user 108 (or application on the mobile communication device 150) to connect to a respective remote network 190 such as the Internet or other type of network, the communication management system 141 connects to any of one or more wireless access points 121, 122, 123, 124, etc., to provide the user 108 and corresponding mobile communication device 150 access to the network 190. Each of the wireless access points are in communication with the remote network 190 via wired or wireless link.

In the learning mode, any suitable criteria can be used to determine which of the multiple wireless access points to establish a respective wireless communication link. For example, in one embodiment, when attempting to connect to a respective wireless access point while the mobile communication device 150 resides in the geographical region 120, via one or more beacons from the wireless access points, the mobile communication device 150 receives notification of the availability of different wireless access points 121, 122, 123, 124, 125, etc.

The mobile communication device 150 selects from these one or more wireless access points in geographical region 120 to connect to the remote network 190 (such as the Internet). In the learning mode, via tracking information 155, the connection management resource 140 keeps track of one or more parameters such as the time of day, day of week, duration of wireless connectivity, etc., associated with each respective established wireless connection.

For each instance of the multiple instances of the mobile communication device 150 connecting to the different wireless access points in the geographical region 120, the connection management resource 140 updates the corresponding tracking information 155.

Accordingly, in the learning mode, via the communication management system 141, embodiments herein include producing tracking information 155 such as a history, habit, etc., of the mobile communication device connecting to different wireless access points at different times and durations while in the geographical region 120.

Figure 4:
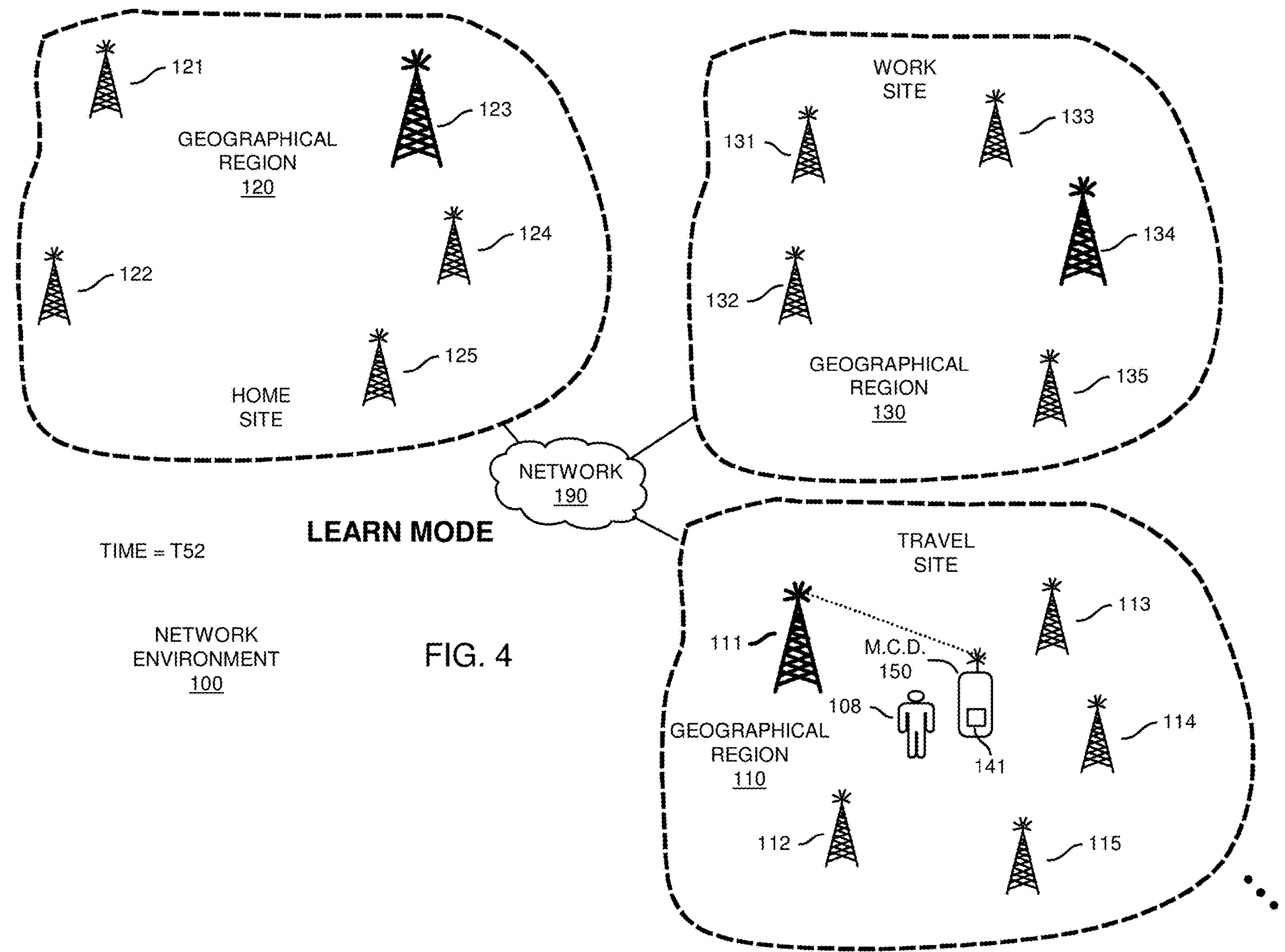
FIG. 4 is an example diagram illustrating operation of a communication management resource in a learning mode while in a third wireless region according to embodiments herein.

FIG. 4 is an example diagram illustrating operation of a communication management system in a learning mode while in a third wireless region according to embodiments herein.

In this example embodiment, the communication management system 141 operates in a learning mode in which the mobile communication device 150 is free (such as with or without input from the user 108 indicating which wireless access point in which to connect) to connect to any of the multiple wireless access points in geographical region 110 (such as visited travel site away from home or work sites).

For example, based on input (such as a command) from the user 108 (or application on the mobile communication device 150) to connect to a respective remote network 190 such as the Internet or other type of network, the communication management system 141 connects to any of one or more wireless access points 111, 112, 113, 114, etc., to provide the user 108 and corresponding mobile communication device 150 access to the network 190. Each of the wireless access points are in communication with the remote network 190 via wired or wireless link.

In the learning mode, any suitable criteria can be used to determine which of the multiple wireless access points to establish a respective wireless communication link. For example, in one embodiment, when attempting to connect to a respective wireless access point while the mobile communication device 150 resides in the geographical region 110, via one or more beacons from the wireless access points, the mobile communication device 150 receives notification of the availability of different wireless access points 111, 112, 113, 114, 115, etc.

The mobile communication device 150 selects from these one or more wireless access points in geographical region 120 to connect to the remote network 190 (such as the Internet). In the learning mode, via tracking information 155, the connection management resource 140 keeps track of one or more parameters such as the time of day, day of week, duration of connectivity, etc., associated with each respective established wireless connection.

For each instance of the multiple instances of the mobile communication device 150 connecting to the different wireless access points in the geographical region 110, the connection management resource 140 updates the corresponding tracking information 155. Accordingly, in the learning mode, via the communication management system 141, embodiments herein include producing tracking information 155 such as a history, habit, etc., of the mobile communication device connecting to different wireless access points at different times while in the geographical region 110.

FIG. 5 is an example diagram illustrating tracking information indicating operation of a respective mobile communication device and corresponding wireless station connectivity according to embodiments herein.

In this example embodiment, the connection management resource 140 produces tracking information 155 indicating different time of day, day of week, duration of connectivity, etc., for each instance that the mobile communication device 150 establishes a wireless communication link with a respective wireless access point to access the remote network 190. In one embodiment, the connection management resource 140 tracks an identity of the each of the wireless access points via one or more unique identifier values (such as SSID, BSSID, network address, etc.) associated with or assigned to the respective wireless access point.

Figure 6:
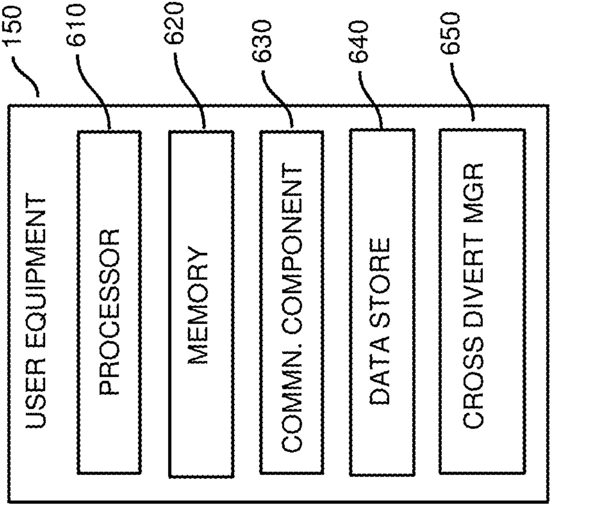
FIG. 6 is an example diagram illustrating implementation of a connection management resource according to embodiments herein.

FIG. 6 is an example diagram illustrating implementation of a connection management resource according to embodiments herein.

In this example embodiment, the mobile communication device 150 such as user equipment includes processor 610, memory 620, communication component 630, data store 640, and cross divert manager 650.

Embodiments herein include a connection management resource disposed at any suitable one or more locations in a network environment.

When the user 108 connects to a respective wireless access point (having a corresponding assigned BSSID such as MAC address, SSID, etc.), the connection management resource 140 stores the following information:

1. BSSID/SSID information of the new wireless access point
2. GPS Location of the new wireless access point (if available)
3. BSSID (Basic Service Set Identifier) connection history record 4. Any unclosed wireless connection history is marked with beginning and/or end timestamp information and data usage is recorded.

In one embodiment, a method is triggered daily (or at another suitable time interval) to analyze the data collected to determine what a user's home/work SSIDs might be. This method can include the following processes of: Location Grouping, Rules of Defining location, Voting and Analysis.

Location Grouping

It is likely that there will be multiple wireless access point (SSIDs) associated with respective wireless access points that represent the same network and/or location. In other words, as previously discussed, each of the geographical regions 110, 120, and 130 includes multiple wireless access points. To account for this, the connection management resource 140 groups locations into different determined Location Groups. In one embodiment, as further discussed herein, each Location Group includes the SSIDs (Service Set Identifier or unique identifier value of the wireless access points) associated with the wireless access points detected as being used by the mobile communication device 150 for a contiguous time period.

Rules for Defining a Location Group

In accordance with further example embodiments, the connection history data is retrieved and put in order based on the connection start timestamp. If a BSSID (unique identifier value such as MAC network address) is within 250* meters and connected to within 60* seconds of the prior BSSID (wireless access point) connection, it is considered the same location group because the user 108 is limited as to how fast he can travel. In one embodiment, the distance is calculated based on an averaged center point of all BSSIDs for the location group. To deal with GPS (Global Positioning System) location discrepancies, if the connection is to the same SSID and connected to within 5 seconds (or other suitable threshold value), the connection and corresponding wireless access point is considered part of the group. The list of SSIDs is constrained to SSIDs not on an excluded networks list. These excluded networks will not be considered as home or work.

Voting

Once the wireless access points have been grouped (detected as being within a same geographical region), the next operation for the connection management resource 140 is to vote on what type of networks it contains. In one embodiment, the voting algorithm uses the hour of the day to determine if the location group is home, work, or other suitable location.

As a location group can cross multiple days, the group is broken into days and the follow logic is applied. If the group falls into the give time range, all SSIDs in the group get a vote for each hour of overlap from the table above. If the hours occur on a weekend the number of votes in the overlap is multiples by the weekend multiplier. This allows us to heavily weight the weekend evenings as home. It also allows us to exclude the weekends for work (x0 multiplier), if deemed appropriate.

Analysis

Once all the votes are added up, a weekly max is calculated. Based on that a daily max is calculated. Then the daily max is multiplied by the number of days collected (min of 3*, max 7). In one embodiment, if desired, the total votes for a given SSID (wireless access point) are divided by the max to get a confidence percentage. This percentage is compared against a configured threshold for home/work. The SSIDs that exceed the threshold are then stored in local metadata for use by the CM engine and analytics.

It may be preferable to use the external IP address to determine location groups rather than their physical location.

It may be possible to use the phones movement to determine whether it's home or work. For example, the user typically does not move his mobile communication device 150 when sleeping.

It may be useful to use the phones charging state to determine whether it's home or work.

Exceptions:

It may be possible for an outlier SSID (wireless access point) to be heavily weighed if consistently connected to for short periods of time in a large location group.

It may be possible part of a network when it is not. For example, if you work/live one floor above a Starbucks™ and walk down, it may be considered one network. Potential mitigation is to lower the timeout for a location group.

Since votes are calculated by hour, it may be possible to have more than 100% if you connect, disconnect for 60* seconds and reconnect.

If a network is erroneously determined to be home or work, Connection Manager will always attempt to connect to it and will be unlikely to be removed without user intervention.

FIG. 7 is an example diagram illustrating implementation of different weights to detected wireless connectivity events to determine a type associated with a respective wireless access point according to embodiments herein.

As previously discussed, embodiments herein include applying weight factors to the collected data to determine a type associated with the wireless access point at a given time of day, day of week, etc.

For example, as shown, for instances of the mobile communication device 150 using a respective wireless access point between midnight (0:00 hours) and 5:59 am (05:59 hours), the connection management resource 140 applies a first multiplier value; for instances of the mobile communication device 150 using a respective wireless access point between 9:00 am (09:00 hours) and 11:59 am (11:59 hours), the connection management resource 140 applies a second multiplier value; for instances of the mobile communication device 150 using a respective wireless access point between 1:00 μm (13:00 hours) and 5:59 μm (17:59 hours), the connection management resource 140 applies a third multiplier value; and so on.

If the day of week is a weekend when it is detected that the mobile communication device 150 connects to a respective wireless access point, the multiplier value can be increased, as it is most likely that the user 108 operates the mobile communication device 150 while at home.

As further discussed herein, in one embodiment, whether weights are implemented or not, the connection management resource 140 classifies a respective detected geographical region (zone of wireless access points) as being of a particular type depending on time of day, day of week, etc., at which the mobile communication device 150 uses the respective one or more wireless access points in the zone (a.k.a., location group).

Figure 8:
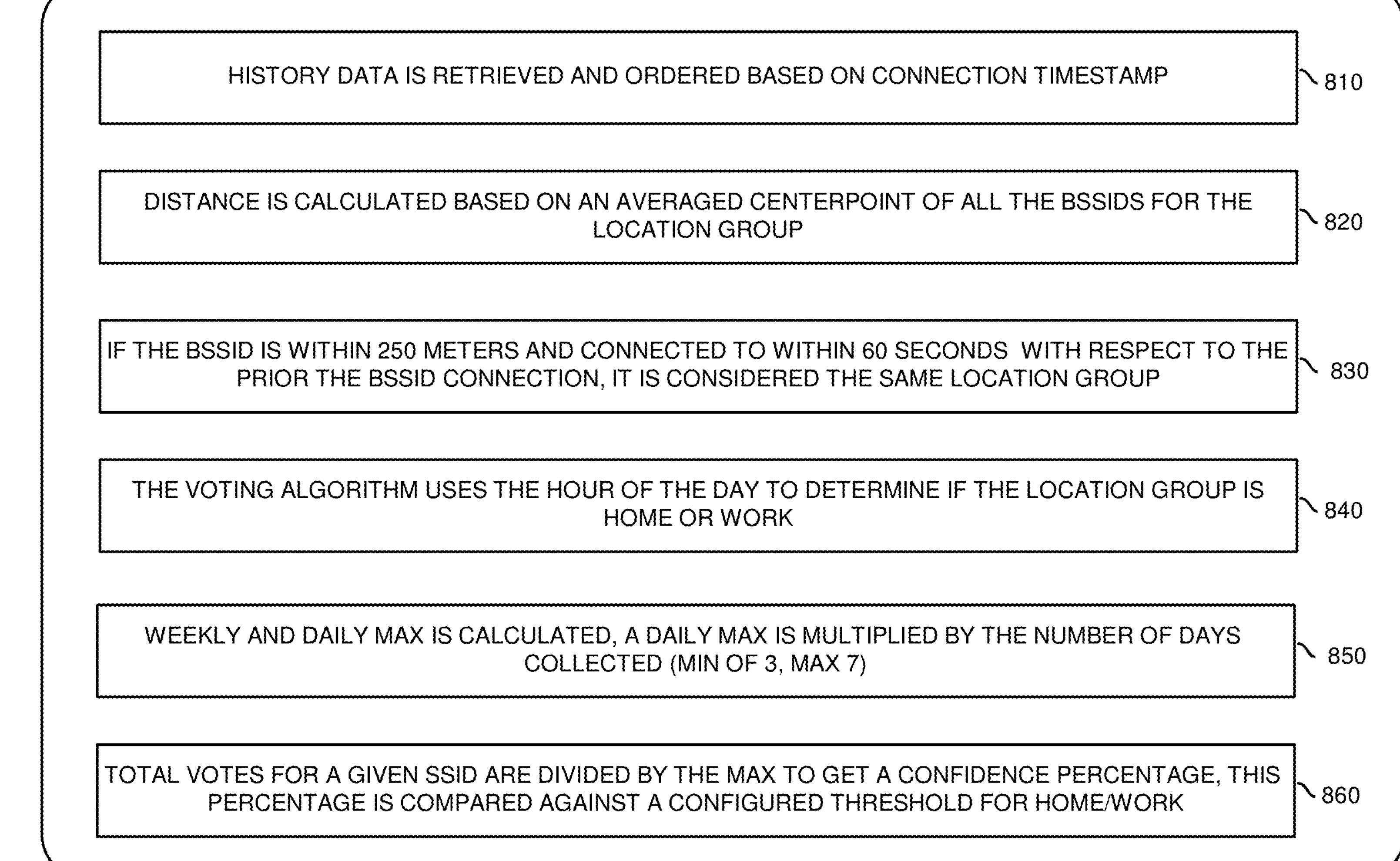
FIG. 8 is an example diagram illustrating execution of a respective connection management resource according to embodiments herein.

FIG. 8 is an example diagram illustrating execution of a respective connection management resource according to embodiments herein.

In this example embodiment, the routine 800 includes multiple operations according to embodiments herein.

For example, via processing operation 810, history data (such as tracking information 155) is retrieved and ordered based on time connection (such as duration length) in a respective geographical region.

Via processing operation 820, the connection management resource 140 calculates a distance of the different wireless access points with respect to each other for a respective group of wireless access points.

Via processing operation 830, the connection management resource 140 determines groupings of the different wireless access points based on timing information of the mobile communication device 150 connecting to the different wireless access points. For example, it is assumed that a respective set of wireless access points are in the same location group based on tracking information 155 indicating that the mobile communication device 150 connects to the different wireless access points in the set within 60 seconds (or other suitable value) of each other.

More specifically, as an example, assume that the connection management resource 140 determines that at some time during the learning mode, the mobile communication device 150 wirelessly connects to the wireless access point 134 within a time such as 29 seconds with respect to a time of the mobile communication device 150 last connecting to the wireless access point 135; since the time value of 29 seconds is less than a threshold value (such as 60 seconds), the connection management resource 140 produces a first location group of wireless access points to include both wireless access point 134 and wireless access point 135 because they are located close to each other. The connection management resource 140 determines that at some time during the learning mode, the mobile communication device 150 wirelessly connects to the wireless access point 133 within a time such as 23 seconds with respect to a time of the mobile communication device 150 last connecting to the wireless access point 134 or 135; since the time value of 23 seconds is less than a threshold value (such as 60 seconds), the connection management resource 140 produces the first location group of wireless access points to include both wireless access points 135, 134, and 133.

As a further example, assume that the connection management resource 140 determines that at some time during the learning mode, the mobile communication device 150 wirelessly connects to the wireless access point 132 within a time such as 56 seconds with respect to a time of the mobile communication device 150 last connecting to the wireless access point 134 or 133; since the time value of 56 seconds is less than a threshold value (such as 60 seconds), the connection management resource 140 produces the first location group of wireless access points to include wireless access point 132.

In this manner, any time the connection management resource 140 detects the connectivity of the mobile communication device 150 to wireless access point already in the first location group is less than a time threshold value, the connection management resource 140 adds the newly detected wireless access point to the first location group.

As a further example embodiment, assume that the connection management resource 140 determines that at some time during the learning mode, the mobile communication device 150 wirelessly connects to the wireless access point 124 within a time such as 15 seconds with respect to a time of the mobile communication device 150 last connecting to the wireless access point 125; since the time value of 15 seconds is less than a threshold value (such as 60 seconds), the connection management resource 140 produces a second location group of wireless access points to include both wireless access point 124 and wireless access point 125 because they are located close to each other. The connection management resource 140 further determines that at some time during the learning mode, the mobile communication device 150 wirelessly connects to the wireless access point 123 within a time such as 44 seconds with respect to a time of the mobile communication device 150 last connecting to the wireless access point 124; since the time value of 44 seconds is less than a threshold value (such as 60 seconds), the connection management resource 140 produces the second location group of wireless access points to include both wireless access points 125, 124, and 123.

As a further example, assume that the connection management resource 140 determines that at some time during the learning mode, the mobile communication device 150 wirelessly connects to the wireless access point 122 within a time such as 59 seconds with respect to a time of the mobile communication device 150 last connecting to the wireless access point 124 or 123; since the time value of 59 seconds is less than a threshold value (such as 60 seconds), the connection management resource 140 produces the second location group of wireless access points to include wireless access point 122 as well.

In this manner, any time the connection management resource 140 detects the connectivity of the mobile communication device 150 to wireless access point already in the second location group, the connection management resource 140 adds the newly detected wireless access point to the second location group.

Although the exact locations of the different wireless access points and corresponding geographical regions in which they reside may not be known by the connection management resource 140, based on the method of detecting connectivity to each of the different wireless access points at different times within the threshold value of 60 seconds (or other suitable value), the connection management resource 140 deems that the group of wireless access points 131, 132, 133, 134, etc., reside in a first geographical region (first location grouping) near each other; the connection management resource 140 deems that the group of wireless access points 121, 122, 123, 124, etc., reside in a second geographical region (second location grouping) near each other; the connection management resource 140 deems that the group of wireless access points 111, 112, 113, 114, etc., reside in a second geographical region (third location grouping) near each other; and so on.

Via processing operation 840, a voting algorithm associated with the connection management resource 140 uses the tracking information 155 to include the access point groupings into different types in a manner as previously discussed. Additionally, the connection management resource 140 classifies the different location groupings based on type. For example, in processing operation 840, the connection management resource 140 determines from the different times that the mobile communication device 150 typically uses the wireless access points 131, 132, 133, 134, 135, etc., between 9 am and 5 μm during a weekday. Based on an assumption that the user 108 works at normal times such as between 9 am and 5 μm on weekdays, the connection management resource 140 determines that the wireless access points 131, 132, 133, 134, 135, etc., reside in a work location associated with the user 108.

The connection management resource 140 determines from the different times that the mobile communication device 150 uses the wireless access points 121, 122, 123, 124, 125, etc., after 5 μm during a weekday or on weekends, the connection management resource 140 determines that the wireless access points 121, 122, 123, 124, 125, etc., reside in a home location associated with the user 108.

Via operation 850, the connection management resource 140 calculates a daily and weekly maximum associated with wireless access point usage in the different geographical regions (location groupings) to determine a predominant wireless access point used in the respective geographical region.

Via operation 860, the connection management resource 140 produces a confidence percentage for each classification type (e.g., whether a wireless access point and corresponding location group is home, work, travel, etc.).

Figure 9:
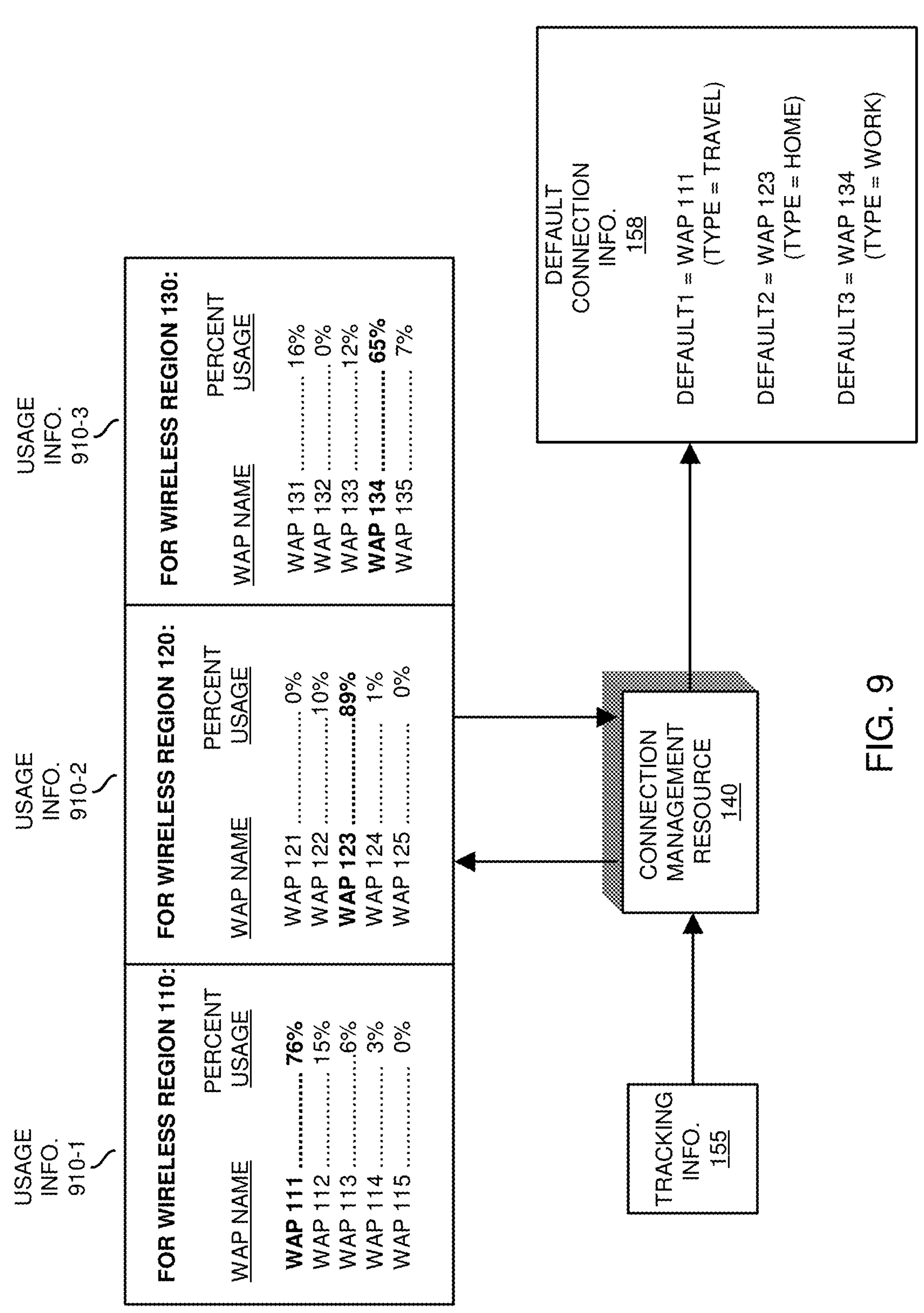
FIG. 9 is an example diagram illustrating a connection management resource processing and converting tracking information into respective default connection information according to embodiments herein.

FIG. 9 is an example diagram illustrating a connection management resource converting tracking information into respective default connection information according to embodiments herein.

In this example embodiment, the connection management resource 140 uses the tracking information 155 generated during the learning mode to produce respective usage information 910-1, usage information 910-2, and usage information 910-3.

As shown, usage information 910-1 indicates a degree (such as based on durations of time) to which the mobile communication device 150 connects to each of the different wireless access points disposed in the first geographical region 110 at different times during the learning mode; usage information 910-2 indicates a degree (such as based on durations of time) to which the mobile communication device 150 connects to each of the different wireless access points disposed in the second geographical region 120 at different times during the learning mode; usage information 910-3 indicates a degree (such as based on durations of time) to which the mobile communication device 150 connects to each of the different wireless access points disposed in the third geographical region 130 at different times during the learning mode; and so on.

For example, based on the tracking information 155 produced during the learning mode (such as on implemented for a duration of time of 1 day, 1 week, 1 month or other suitable value): the mobile communication device 150 was detected as connecting to the wireless access point 111 for 76% of the total wireless usage time that the mobile communication device 150 was present in the geographical region 110 and provided corresponding access to the remote network via a wireless access point in the geographical region 110; the mobile communication device 150 was detected as connecting to the wireless access point 112 for 15% of the total wireless usage time that the mobile communication device 150 was present in the geographical region 110 and provided corresponding access to the remote network via a wireless access point in the geographical region 110; the mobile communication device 150 was detected as connecting to the wireless access point 113 for 6% of the total wireless usage time that the mobile communication device 150 was present in the geographical region 110 and provided corresponding access to the remote network via a wireless access point in the geographical region 110; the mobile communication device 150 was detected as connecting to the wireless access point 114 for 3% of the total wireless usage time that the mobile communication device 150 was present in the geographical region 110 and provided corresponding access to the remote network via a wireless access point in the geographical region 110; the mobile communication device 150 was detected as connecting to the wireless access point 115 for 0% (less than 1%) of the total wireless usage time that the mobile communication device 150 was present in the geographical region 110 and provided corresponding access to the remote network via a wireless access point in the geographical region 110; and so on. The connection management resource 140 uses this monitored information to generate usage information 910-1.

Based on the tracking information 155 produced during the learning mode (such as implemented for a duration of time of 1 day, 1 week, 1 month or other suitable value): the mobile communication device 150 was detected as connecting to the wireless access point 121 for 0% (less than 1%) of the total wireless usage time that the mobile communication device 150 was present in the geographical region 120 and provided corresponding access to the remote network via a wireless access point in the geographical region 120; the mobile communication device 150 was detected as connecting to the wireless access point 122 for 10% of the total wireless usage time that the mobile communication device 150 was present in the geographical region 120 and provided corresponding access to the remote network via a wireless access point in the geographical region 120; the mobile communication device 150 was detected as connecting to the wireless access point 123 for 89% of the total wireless usage time that the mobile communication device 150 was present in the geographical region 120 and provided corresponding access to the remote network via a wireless access point in the geographical region 120; the mobile communication device 150 was detected as connecting to the wireless access point 124 for 1% of the total wireless usage time that the mobile communication device 150 was present in the geographical region 120 and provided corresponding access to the remote network via a wireless access point in the geographical region 120; the mobile communication device 150 was detected as connecting to the wireless access point 125 for 0% (less than 1%) of the total wireless usage time that the mobile communication device 150 was present in the geographical region 120 and provided corresponding access to the remote network via a wireless access point in the geographical region 120; and so on. The connection management resource 140 uses this monitored information to generate usage information 910-2.

Based on the tracking information 155 produced during the learning mode (such as on implemented for a duration of time of 1 day, 1 week, 1 month or other suitable value): the mobile communication device 150 was detected as connecting to the wireless access point 131 for 16% of the total wireless usage time that the mobile communication device 150 was present in the geographical region 130 and provided corresponding access to the remote network via a wireless access point in the geographical region 130; the mobile communication device 150 was detected as connecting to the wireless access point 132 for 0% (less than 1%) of the total wireless usage time that the mobile communication device 150 was present in the geographical region 130 and provided corresponding access to the remote network 190 via a wireless access point in the geographical region 130; the mobile communication device 150 was detected as connecting to the wireless access point 133 for 12% of the total wireless usage time that the mobile communication device 150 was present in the geographical region 130 and provided corresponding access to the remote network 190 via a wireless access point in the geographical region 130; the mobile communication device 150 was detected as connecting to the wireless access point 134 for 65% of the total wireless usage time that the mobile communication device 150 was present in the geographical region 130 and provided corresponding access to the remote network via a wireless access point in the geographical region 130; the mobile communication device 150 was detected as connecting to the wireless access point 135 for 7% of the total wireless usage time that the mobile communication device

150 was present in the geographical region 130 and provided corresponding access to the remote network via a wireless access point in the geographical region 130; and so on. The connection management resource 140 uses this monitored information to generate usage information 910-3.

Subsequent to generating the usage information 910 for different geographical regions of wireless access points, the connection management resource 140 produces default connection information 158 indicating the default (preferred) wireless access point in which to connect while the mobile communication device 150 resides in that corresponding geographical region.

In one embodiment, the default wireless access point is chosen based on which wireless access point the mobile communication device 150 used the most (such as greatest overall duration of time) in the corresponding geographical region during the learning mode.

For example, based on highest usage or other suitable parameter, the connection management resource 140 assigns the wireless access point 111 as a default wireless access point associated with the geographical region 110. As previously discussed, based on the times of day, days of week, durations of time, etc., associated with the instances in which the mobile communication device 150 was detected using the wireless access point 111, the connection management resource 140 assigns the wireless access point 111 as a default wireless access point associated with the mobile communication device 150 when the user is away from the home or work site.

Based on highest usage or other suitable parameter, the connection management resource 140 further assigns the wireless access point 123 as a default wireless access point associated with the geographical region 120. As previously discussed, based on the times of day, days of week, durations of time, etc., associated with the time in which the mobile communication device 150 was detected using the wireless access point 121, the connection management resource 140 assigns the wireless access point 121 as a default wireless access point associated with the mobile communication device 150 when the user is at a work (such as during work hours).

Based on highest usage or other suitable parameter, the connection management resource 140 assigns the wireless access point 134 as a default wireless access point associated with the geographical region 130. As previously discussed, based on the times of day, days of week, durations of time, etc., associated with the time in which the mobile communication device 150 was detected using the wireless access point 134, the connection management resource 140 assigns the wireless access point 134 as a default wireless access point associated with the mobile communication device 150 when the user is at a home (such as during home hours).

Figure 10:
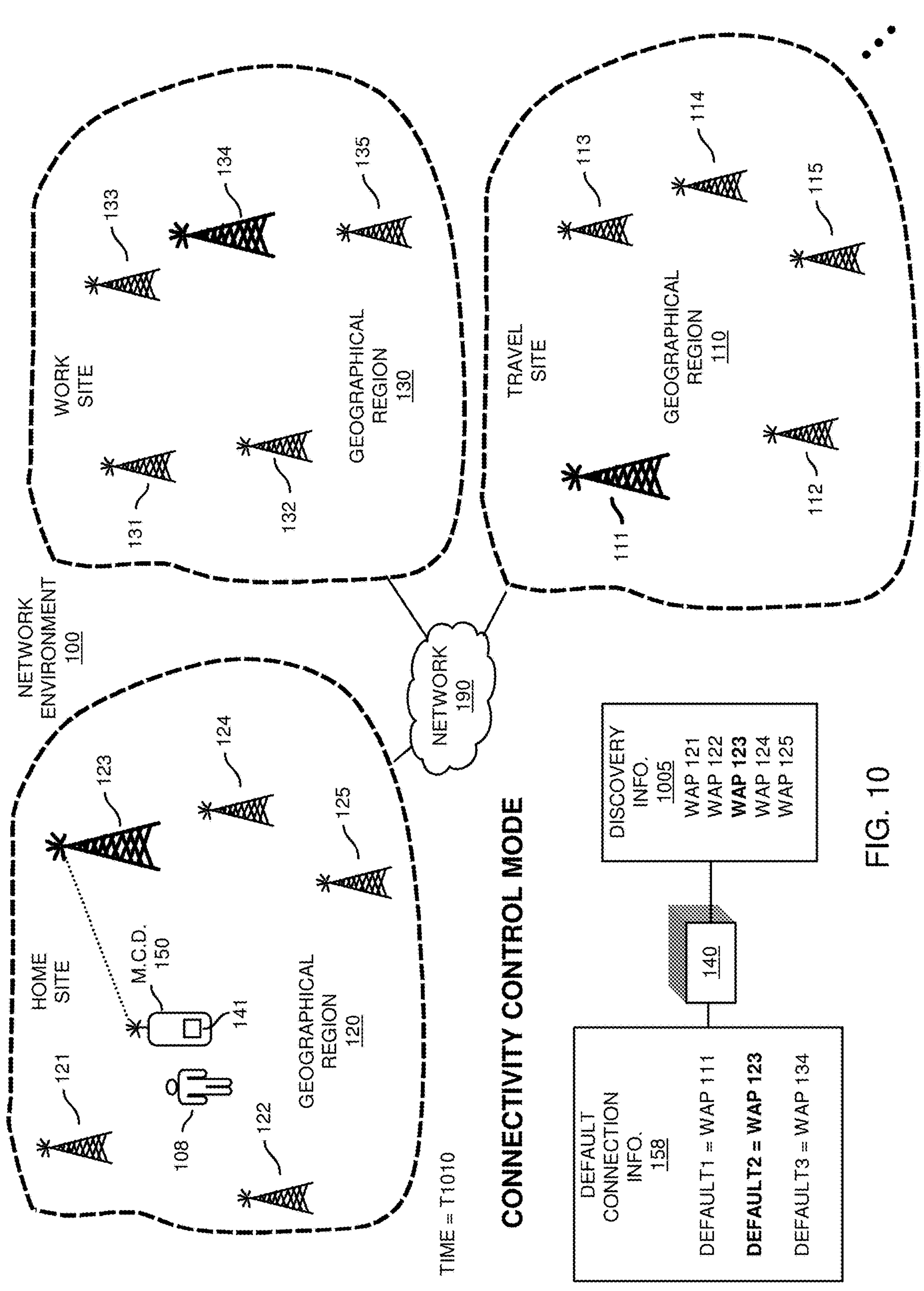
FIG. 10 is an example diagram illustrating discovery of multiple wireless access points in a vicinity of a mobile communication device and connection to a respective default wireless access point for a first region according to embodiments herein.

FIG. 10 is an example diagram illustrating discovery of multiple wireless access points in a vicinity of a mobile communication device and connection to a respective default wireless access point for a first region according to embodiments herein.

As further shown in FIG. 10, at or around time T1010, during a connectivity control mode (after implementing the learning mode in a manner as previously discussed), the connection management resource 140 uses the produced default connection information 158 as a basis in which to control (e.g., prioritize) wireless access point connectivity of the respective mobile communication device 150.

For example, assume that the mobile communication device 150 receives a command to connect to the remote network 190. In such an instance, as indicated by the discovery information 1005, the mobile communication device 150 detects presence of wireless access point 121, wireless access point 122, wireless access point 123, wireless access point 124, wireless access point 125, etc.

In one embodiment, the mobile communication device 150 detects presence of the different wireless access points in the geographical region 120 based upon the wireless access points communicating beacon information indicating their respective identities.

For example, the wireless access point 121 communicates a respective identity of the wireless access point 121 to the mobile communication device 150; the wireless access point 122 communicates a respective identity of the wireless access point 122 to the mobile communication device 150; the wireless access point 123 communicates a respective identity of the wireless access point 123 to the mobile communication device 150; the wireless access point 124 communicates a respective identity of the wireless access point 124 to the mobile communication device 150; the wireless access point 125 communicates a respective identity of the wireless access point 125 to the mobile communication device 150; and so on.

In order to provide priority connectivity of the wireless mobile communication device 150 to the remote network 190, the connection management resource 140 determines which, if any, of the discovered wireless access point as indicated by the discovery information 1005 is considered to be a respective default wireless access point associated with the mobile communication device 150. As previously discussed, the connection management resource 140 uses the default connection information 158 as a basis to prioritize connectivity of the mobile communication device to a respective wireless access point.

In this example embodiment, the connection management resource 140 determines (via the default connection information 158) that the wireless access point 134 is a respective default wireless access point given highest priority when connecting the mobile communication device 150 to a wireless access point. In such an instance, as a response to the connectivity request, the mobile communication device 150 establishes wireless connectivity with the wireless access point 123 because it is deemed a default wireless access point as indicated by the default connection information 158. In other words, the connection management resource 140 matches the discovery information 1005 to the default connection information 158 to identify which of the wireless access points indicated by the discovery information 1005 are default wireless access points. Subsequent to establishing connectivity with the default wireless access point 123, the wireless access point 123 then provides the mobile communication device and corresponding user 108 access to the remote network 190.

More specifically, in one embodiment, the mobile communication device 150 transmits wireless communications over a respective established wireless communication link to the wireless access point 123; the wireless access point forwards the respective communications over a communication link to the network 190 where the respective communications are delivered to a target destination as specified by the mobile communication device 150. In a reverse direction, the target destination communicates communications over network 190 to the wireless access point 123; the wireless access point 123 forwards the received communications over the wireless communication link to the mobile communication device 150 for processing by a respective application on the mobile communication device 150.

In this manner, the connection management resource 140 controls connectivity of the mobile communication device 150 to a respective default wireless access point 123 when the mobile communication device 150 is operated in the geographical region 120.

Figure 11:
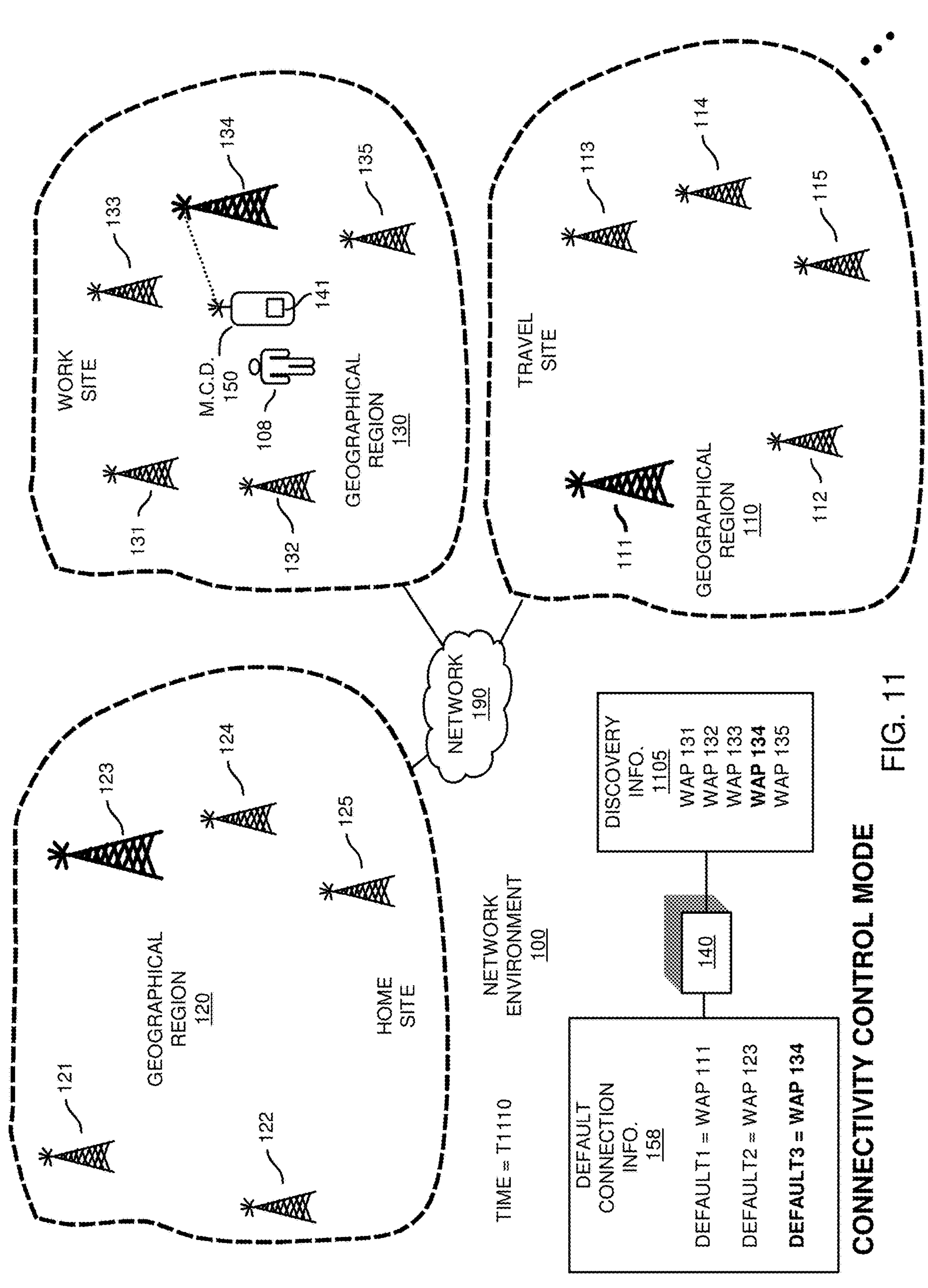
FIG. 11 is an example diagram illustrating discovery of multiple wireless access points in a vicinity of a mobile communication device and connection to a respective default wireless access point for a second region according to embodiments herein.

FIG. 11 is an example diagram illustrating discovery of multiple wireless access points in a vicinity of a mobile communication device and connection to a respective default wireless access point for a second region according to embodiments herein.

As further shown in FIG. 11, at or around time T1110, during a connectivity control mode (after implementing the learning mode in a manner as previously discussed), the connection management resource 140 uses the produced default connection information 158 as a basis in which to control (e.g., prioritize) wireless access point connectivity of the respective mobile communication device 150.

For example, assume that the mobile communication device 150 receives a command to connect to the remote network 190 while present in geographical region 130. In such an instance, as indicated by the discovery information 1105, the mobile communication device 150 detects presence of wireless access point 131, wireless access point 132, wireless access point 133, wireless access point 134, wireless access point 135, etc., as available wireless access points.

In one embodiment, the mobile communication device 150 detects presence of the different wireless access points in the geographical region 130 based upon the wireless access points communicating beacon information indicating their respective identities. For example, the wireless access point 131 communicates a respective identity of the wireless access point 131 to the mobile communication device 150; the wireless access point 132 communicates a respective identity of the wireless access point 132 to the mobile communication device 150; the wireless access point 133 communicates a respective identity of the wireless access point 133 to the mobile communication device 150; the wireless access point 134 communicates a respective identity of the wireless access point 134 to the mobile communication device 150; the wireless access point 135 communicates a respective identity of the wireless access point 135 to the mobile communication device 150; and so on.

In order to provide priority connectivity of the wireless mobile communication device 150 to the remote network 190, the connection management resource 140 determines which, if any, of the discovered wireless access point as indicated by the discovery information 1105 is considered to be a respective default wireless access point associated with the mobile communication device 150. As previously discussed, the connection management resource 140 uses the default connection information 158 as a basis to prioritize connectivity of the mobile communication device to a respective wireless access point.

In this example embodiment, the connection management resource 140 determines via the default connection information 158 that the wireless access point 134 is a respective default wireless access point given highest priority when connecting the mobile communication device 150 to the remote network 190 for a corresponding location group. In such an instance, as a response to the connectivity request, the mobile communication device 150 establishes wireless connectivity with the wireless access point 134 because it is deemed a default wireless access point as indicated by the default connection information 158. Subsequent to establishing connectivity, the wireless access point 134 then provides the mobile communication device and corresponding user 108 access to the remote network 190. In other words, the connection management resource 140 matches the wireless access point 134 in the discovery information 1105 to the default connection information 158 to identify which of the wireless access points indicated by the discovery information 1005 are default wireless access points. Subsequent to establishing connectivity with the default wireless access point 123, the wireless access point 123 then provides the mobile communication device and corresponding user 108 access to the remote network 190.

More specifically, in one embodiment, the mobile communication device 150 transmits wireless communications over a respective established wireless communication link to the wireless access point 134; the wireless access point forwards the respective communications over a communication link to the network 190 where the respective communications are delivered to a target destination as specified by the mobile communication device 150. In a reverse direction, the target destination communicates communications over network 190 to the wireless access point 134; the wireless access point 134 forwards the received communications over the wireless communication link to the mobile communication device 150 for processing by a respective application on the mobile communication device 150.

In this manner, the connection management resource 140 controls connectivity of the mobile communication device 150 to a respective default wireless access point 134 when the mobile communication device 150 is operated in the geographical region 120.

Figure 12:
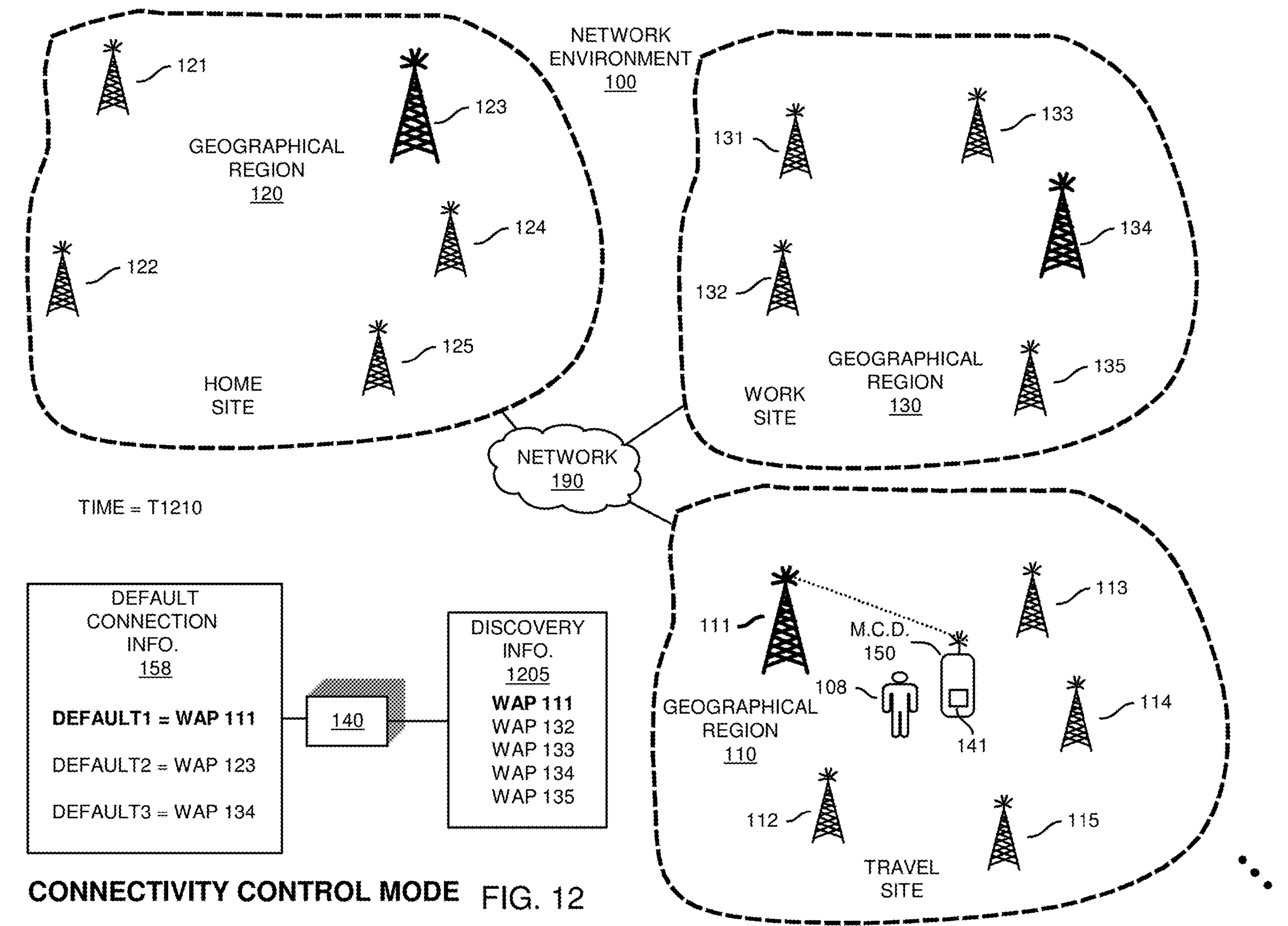
FIG. 12 is an example diagram illustrating discovery of multiple wireless access points in a vicinity of a mobile communication device and connection to a respective default wireless access point for a third region according to embodiments herein.

FIG. 12 is an example diagram illustrating discovery of multiple wireless access points in a vicinity of a mobile communication device and connection to a respective default wireless access point for a third region according to embodiments herein.

As further shown in FIG. 12, at or around time T1210, during a connectivity control mode (after implementing the learning mode in a manner as previously discussed), the connection management resource 140 uses the produced default connection information 158 as a basis in which to control (e.g., prioritize) wireless access point connectivity of the respective mobile communication device 150.

For example, assume that the mobile communication device 150 receives a command to connect to the remote network 190 while present in geographical region 110. In such an instance, as indicated by the discovery information 1205, the mobile communication device 150 detects presence of wireless access point 111, wireless access point 112, wireless access point 113, wireless access point 114, wireless access point 115, etc., as available wireless access points.

In one embodiment, the mobile communication device 150 detects presence of the different wireless access points in the geographical region 110 based upon the wireless access points communicating beacon information indicating their respective identities. For example, the wireless access point 111 communicates a respective identity of the wireless access point 111 to the mobile communication device 150; the wireless access point 112 communicates a respective identity of the wireless access point 112 to the mobile communication device 150; the wireless access point 113 communicates a respective identity of the wireless access point 113 to the mobile communication device 150; the wireless access point 114 communicates a respective identity of the wireless access point 114 to the mobile communication device 150; the wireless access point 115 communicates a respective identity of the wireless access point 115 to the mobile communication device 150; and so on.

In order to provide priority connectivity of the wireless mobile communication device 150 to the remote network 190, the connection management resource 140 determines which, if any, of the discovered wireless access points as indicated by the discovery information 1205 is considered to be a respective default wireless access point associated with the mobile communication device 150. As previously discussed, the connection management resource 140 uses the default connection information 158 as a basis to prioritize connectivity of the mobile communication device to a respective wireless access point.

In this example embodiment, the connection management resource 140 determines via the default connection information 158 that the wireless access point 111 is a respective default wireless access point given highest priority when connecting the mobile communication device 150 to the remote network 190. In such an instance, as a response to the connectivity request, the mobile communication device 150 establishes wireless connectivity with the wireless access point 111 because it is deemed a default wireless access point as indicated by the default connection information 158. Subsequent to establishing connectivity, the wireless access point 111 then provides the mobile communication device and corresponding user 108 access to the remote network 190. In other words, the connection management resource 140 matches the discovery information 1005 to the default connection information 158 to identify which of the wireless access points indicated by the discovery information 1005 are default wireless access points. Subsequent to establishing connectivity with the default wireless access point 123, the wireless access point 123 then provides the mobile communication device and corresponding user 108 access to the remote network 190.

More specifically, in one embodiment, the mobile communication device 150 transmits wireless communications over a respective established wireless communication link to the wireless access point 111; the wireless access point 111 forwards the respective communications over a communication link to the network 190 where the respective communications are delivered to a target destination as specified by the mobile communication device 150. In a reverse direction, the target destination communicates communications over network 190 to the wireless access point 111; the wireless access point 111 forwards the received communications over the wireless communication link to the mobile communication device 150 for processing by a respective application on the mobile communication device 150.

In this manner, the connection management resource 140 controls connectivity of the mobile communication device 150 to a respective default wireless access point 111 when the mobile communication device 150 is operated in the geographical region 110.

Figure 13:
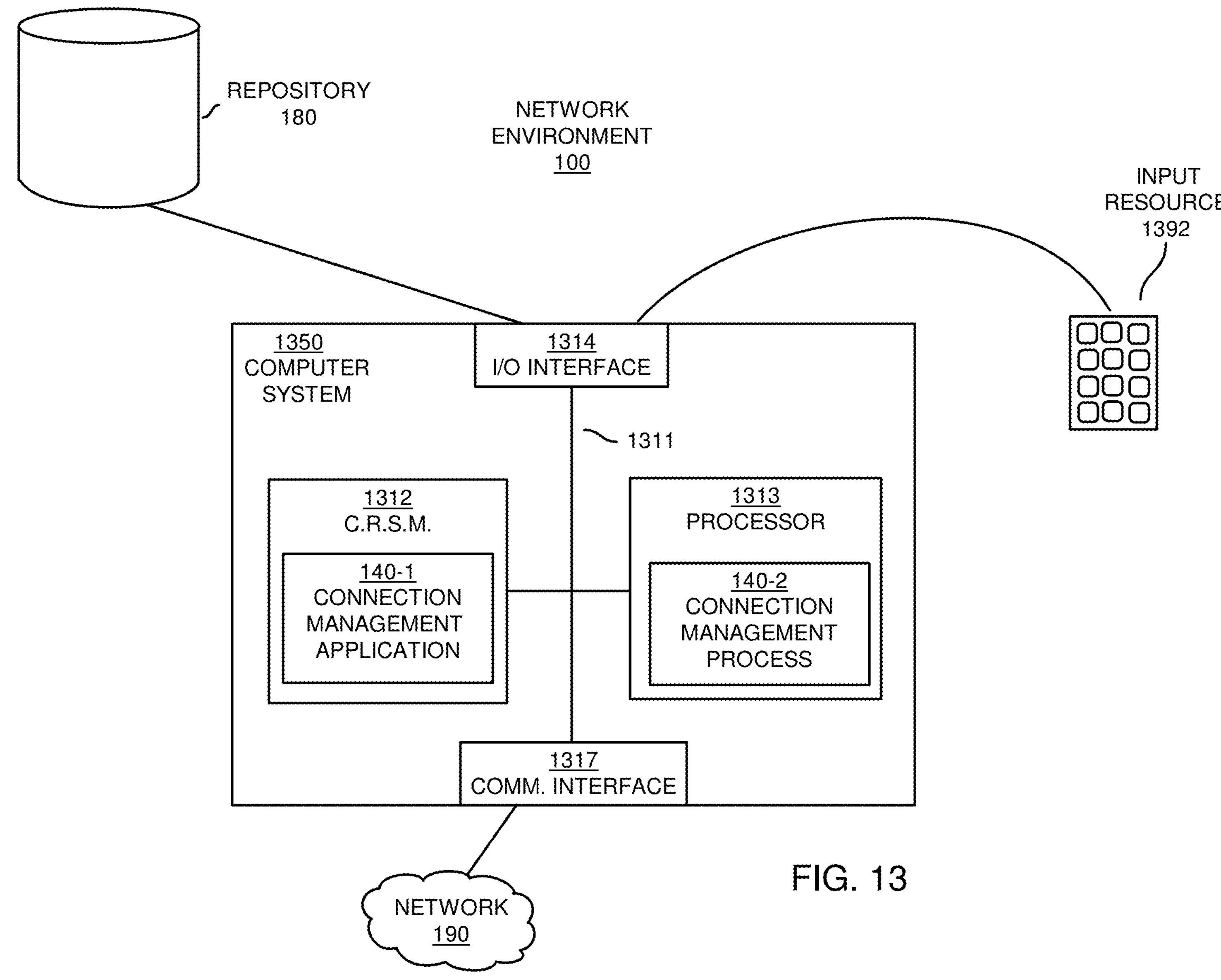
FIG. 13 is an example diagram illustrating example computer architecture operable to execute one or more operations according to embodiments herein.

FIG. 13 is an example block diagram of a computer system for implementing any of the operations as previously discussed according to embodiments herein.

Any of the resources (such as mobile communication devices, wireless base stations, connection management resource 140, communication management system 141, etc.) as discussed herein can be configured to include computer processor hardware and/or corresponding executable instructions to carry out the different operations as discussed herein via computer system 1350.

As shown, computer system 1350 of the present example includes an interconnect 1311 that coupling computer readable storage media 1312 such as a non-transitory type of media (which can be any suitable type of hardware storage medium in which digital information can be stored and retrieved), a processor 1313 (computer processor hardware), I/O interface 1314, and a communications interface 1317.

I/O interface(s) 1314 supports connectivity to repository 1380 and input resource 1392.

Computer readable storage medium 1312 can be any hardware storage device such as memory, optical storage, hard drive, floppy disk, etc. In one embodiment, the computer readable storage medium 1312 stores instructions and/or data.

As shown, computer readable storage media 1312 can be encoded with connection management application 140-1 (e.g., including instructions) to carry out any of the operations as discussed herein.

During operation of one embodiment, processor 1313 accesses computer readable storage media 1312 via the use of interconnect 1311 in order to launch, run, execute, interpret or otherwise perform the instructions in connection management application 140-1 stored on computer readable storage medium 1312. Execution of the connection management application 140-1 produces connection management process 140-2 to carry out any of the operations and/or processes as discussed herein. In other words, connection management application 140-1 can be configured to execute operations associated with one or more of communication management system 141, connection management resource 140, mobile communication device 150, etc.

Those skilled in the art will understand that the computer system 1350 can include other processes and/or software and hardware components, such as an operating system that controls allocation and use of hardware resources to execute connection management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1350 may reside at any location or can be included in any suitable resource in any network environment to implement functionality as discussed herein. In one embodiment, the control system 1350 can include or be implemented in virtualization environments such as the cloud.

Functionality supported by the different resources will now be discussed via flowchart 1400 in FIG. 14. Note that the steps in the flowcharts below can be executed in any suitable order.

Figure 14:
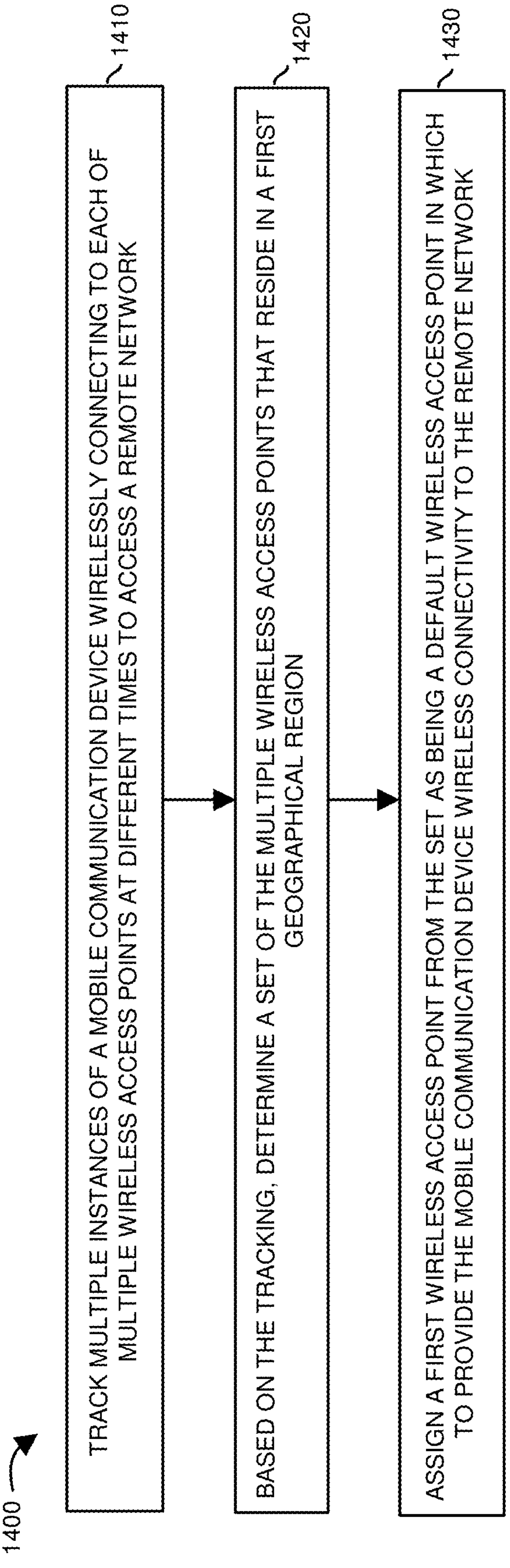
FIG. 14 is an example diagram illustrating a method according to embodiments herein.

FIG. 14 is a flowchart 1400 illustrating an example method according to embodiments. Note that flowchart 1400 overlaps/captures general concepts as discussed herein.

In processing operation 1410, the connection management resource 140 (such as disposed in the mobile communication device 150 or other suitable location) tracks multiple instances of the mobile communication device 150 wirelessly connecting to each of multiple wireless access points at different times to access a remote network 190.

In processing operation 1420, based on the tracking (such as tracking information 155), the connection management resource 140 determines a set of the multiple wireless access points that reside in a first geographical region.

In processing operation 1430, the connection management resource 140 assigns a first wireless access point from the set as being a default wireless access point in which to provide the mobile communication device 150 wireless connectivity to the remote network.

Note again that techniques herein are well suited to facilitate classification of wireless access points and implement wireless connectivity preferences (priorities) in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

at a mobile communication device, receiving identities of multiple wireless access points available in a first geographical region for providing the mobile communication device wireless access to a remote network;

determining that a first wireless access point of the multiple wireless access points is assigned as a default wireless access point for the first geographical region, the default wireless access point selected amongst the multiple wireless access points in the first geographical region;

at a first instance of time, in response to detecting presence of the mobile communication device in the first geographical region and detecting that the first wireless access point is the default wireless access point associated with the first geographical region to access the remote network, establishing first wireless connectivity between the mobile communication device and the first wireless access point; and wherein the first wireless access point is assigned as being the default wireless access point associated with the first geographical region in response to detecting a higher percentage of a first usage by the mobile communication device to access the remote network via the first wireless access point during a first time of day range for each of multiple days than a second usage by the mobile communication device to access the remote network via a second wireless access point of the multiple wireless access points during the first time of day range for each of the multiple days.

2. The method as in claim 1, wherein determining that the first wireless access point is assigned as the default wireless access point associated with the first geographical region includes: obtaining tracking information indicating prior connectivity of the mobile communication device to each of the multiple wireless access points; and wherein the tracking information indicates a ranking of the multiple wireless access points based on prior wireless connections established between the mobile communication device and the multiple wireless access points.

3. The method as in claim 2, wherein the ranking is based on a frequency of the mobile communication device previously wirelessly connecting to each of the multiple wireless access points.

4. The method as in claim 1, wherein the default wireless access point for the first geographical region is a first default wireless access point, the method further comprising:

at a second instance of time, in response to detecting that the mobile communication device is present in a second geographical region disparately located with respect to the first geographical region: i) determining that a second wireless access point is assigned as a second default wireless access point associated with the second geographical region, and ii) establishing second wireless connectivity between the mobile communication device and the second wireless access point.

5. The method as in claim 4, wherein the first wireless access point is absent from the second geographical region; and wherein the second wireless access point is absent from the first geographical region.

6. The method as in claim 5, wherein the first default wireless access point is assigned to the first geographical region in response to detecting first prior use of the first wireless access point by the mobile communication device within the first time of day range on each of multiple different days, the first prior use occurring before the first instance of time; and wherein the second default wireless access point is assigned to the second geographical region in response to detecting a second prior use of the second wireless access point by the mobile communication device within a second time of day range on each of the multiple different days, the second prior use occurring before the second instance of time.

7. The method as in claim 6, wherein the second time of day range is non-overlapping with respect to the first time of day range.

8. A method comprising:

tracking multiple instances of a mobile communication device wirelessly connecting to each of multiple wireless access points in multiple geographical regions at different times of day to access a remote network;

based on the tracking, determining a first set of wireless access points from the multiple wireless access points, the first set of wireless access points residing in a first geographical region of the multiple geographical regions;

assigning a first wireless access point from the first set as being a first default wireless access point associated with the first geographical region in which to provide the mobile communication device subsequent wireless access to the remote network; and assigning the first wireless access point from the first set as being the first default wireless access point associated with the first geographical region in response to detecting a higher percentage of first usage by the mobile communication device to access the remote network via the first wireless access point during a first time of day range for each of multiple days than a second usage by the mobile communication device to access the remote network via a second wireless access point of the multiple wireless access points during the first time of day range for each of the multiple days.

9. The method as in claim 8 further comprising:

classifying the first wireless access point as being a particular type of network depending on times of day when the mobile communication device connects to the first wireless access point.

10. The method as in claim 9, wherein classifying the first wireless access point as being a particular type of network is based in part on different days of week when the mobile communication device connects to the first wireless access point.

11. The method as in claim 8, wherein determining the set of the multiple wireless access points that reside in the first geographical region includes:

detecting that the mobile communication device communicates with each of the multiple wireless access points in the set within a respective window of time.

12. The method as in claim 8 further comprising:

determining a second set of wireless access points from the multiple wireless access points, the second set of wireless access points residing in a second geographical region of the multiple geographical regions;

selecting a second wireless access point from the second set of wireless access points; and assigning the second wireless access point from the second set as being a second default wireless access point associated with the second geographical region in which to provide the mobile communication device subsequent wireless access to the remote network.

13. The method as in claim 8 further comprising:

based on the tracking, determining a second set of wireless access points from the multiple wireless access points, the second set of wireless access points detected as residing in a second geographical region of the multiple geographical regions, the second set of wireless access points including a third wireless access point and a fourth wireless access point; and assigning the third wireless access point from the second set as being a second default wireless access point associated with the second geographical region in response to detecting a higher percentage of third usage by the mobile communication device to access the remote network via the third wireless access point during a second time of day range for each of the multiple days than a fourth usage by the mobile communication device to access the remote network via the fourth wireless access point of the multiple wireless access points during the second time of day range for each of the multiple days.

14. A system comprising:

communication management hardware operative to:

receive identities of multiple wireless access points available in a first geographical region for providing a mobile communication device wireless access to a remote network;

determine that a first wireless access point of the multiple wireless access points is assigned as a default wireless access point for the first geographical region, the default wireless access point selected amongst the multiple wireless access points in the first geographical region;

at a first instance of time, in response to detecting presence of the mobile communication device in the first geographical region and detecting that the first wireless access point is the default wireless access point associated with the first geographical region to access the remote network, establish first wireless connectivity between the mobile communication device and the first wireless access point; and wherein the first wireless access point is assigned as being the default wireless access point associated with the first geographical region in response to detecting a higher percentage of first usage by the mobile communication device to access the remote network via the first wireless access point during a first time of day range for each of multiple days than a second usage by the mobile communication device to access the remote network via a second wireless access point of the multiple wireless access points during the first time of day range for each of the multiple days.

15. A system comprising:

communication management hardware operative to:

track multiple instances of a mobile communication device wirelessly connecting to each of multiple wireless access points in multiple geographical regions at different times of day to access a remote network;

based on the tracking, determine a first set of wireless access points from the multiple wireless access points, the first set of wireless access points residing in a first geographical region of the multiple geographical regions;

assign a first wireless access point from the first set as being a first default wireless access point associated with the first geographical region in which to provide the mobile communication device subsequent wireless access to the remote network; and assign the first wireless access point from the first set as being the first default wireless access point associated with the first geographical region in response to detecting a higher percentage of a first usage by the mobile communication device to access the remote network via the first wireless access point during a first time of day range for each of multiple days than a second usage by the mobile communication device to access the remote network via a second wireless access point of the multiple wireless access points during the first time of day range for each of the multiple days.

16. The system as in claim 15, wherein the communication management hardware is further operative to:

assign the first wireless access point from the first set of wireless access points as being the first default wireless access point associated with the first geographical region in response to detecting a greater amount of usage by the mobile communication device accessing the remote network through the first wireless access point than usage by the mobile communication device accessing the remote network through a second wireless access point of the multiple wireless access points.

* * * * *